June 16, 1925.
C. A. FLEMING
FLYTRAP
Filed Jan. 22. 1924
1,541,805
4 Sheets-Sheet 1
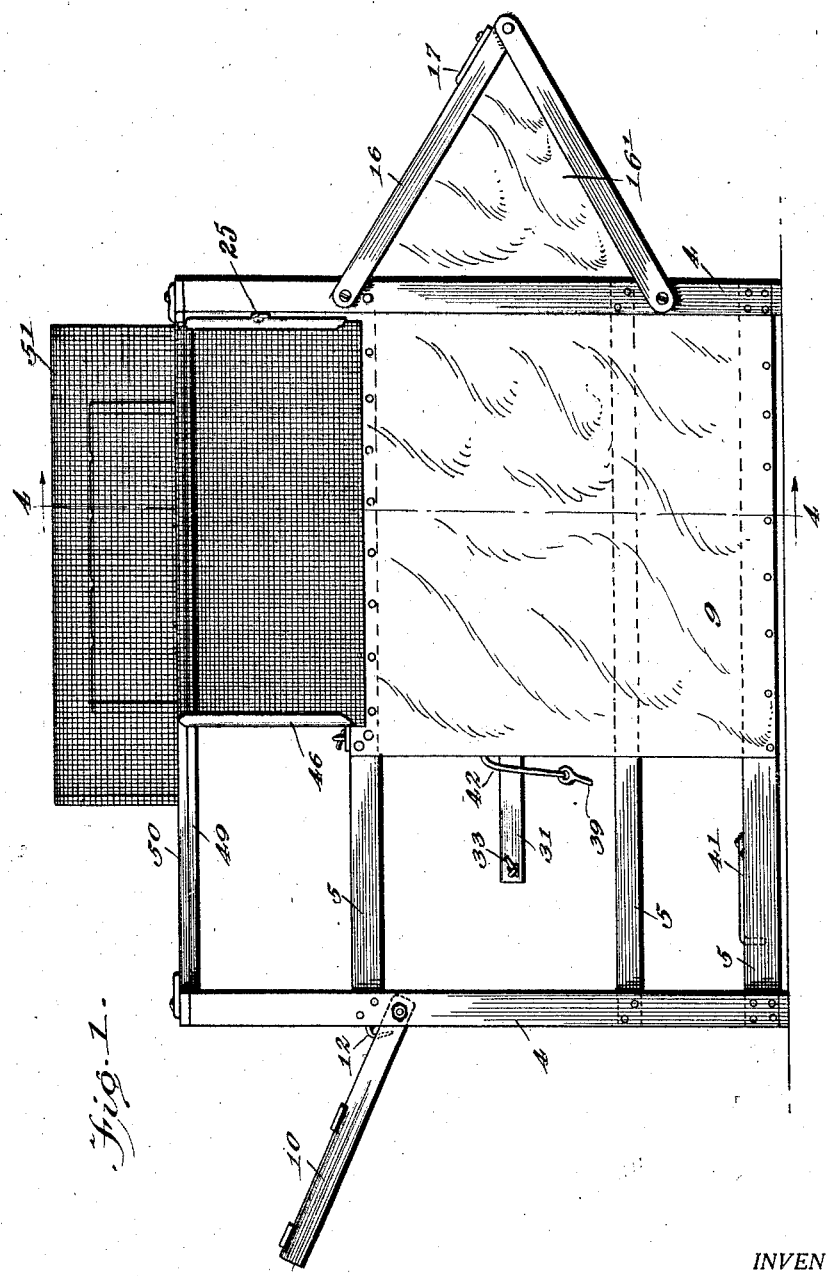
INVENTOR
C. A. Fleming
BY
ATTORNEYS

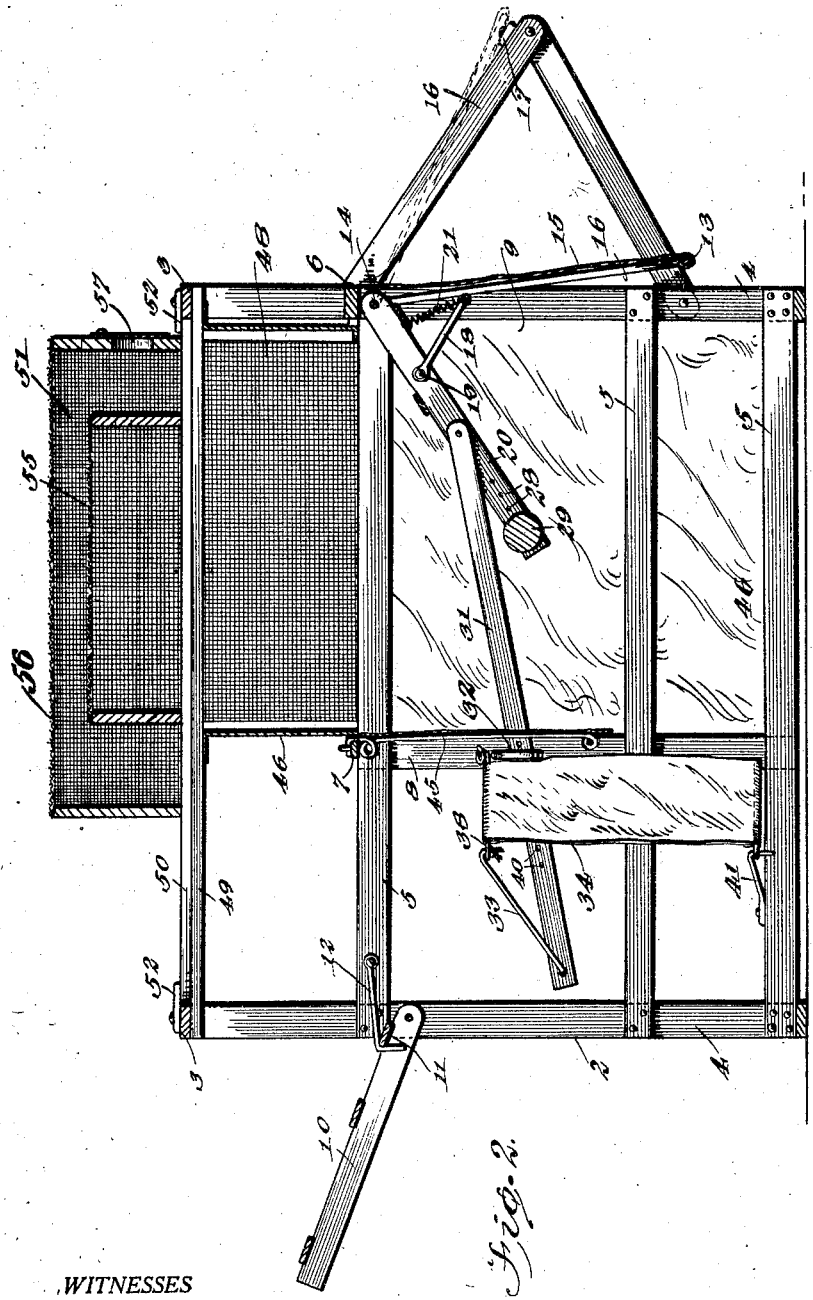

June 16, 1925.
C. A. FLEMING
FLYTRAP
Filed Jan. 22, 1924
1,541,805
4 Sheets-Sheet 3
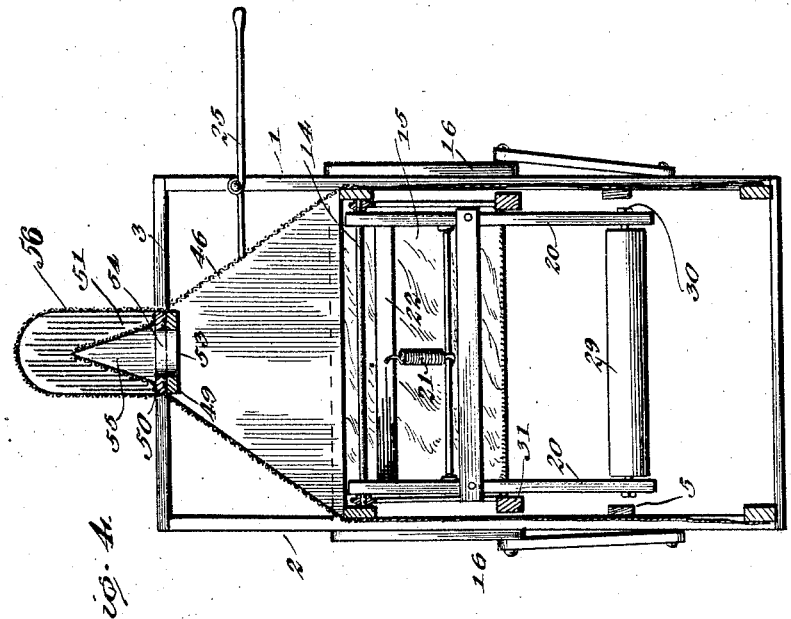
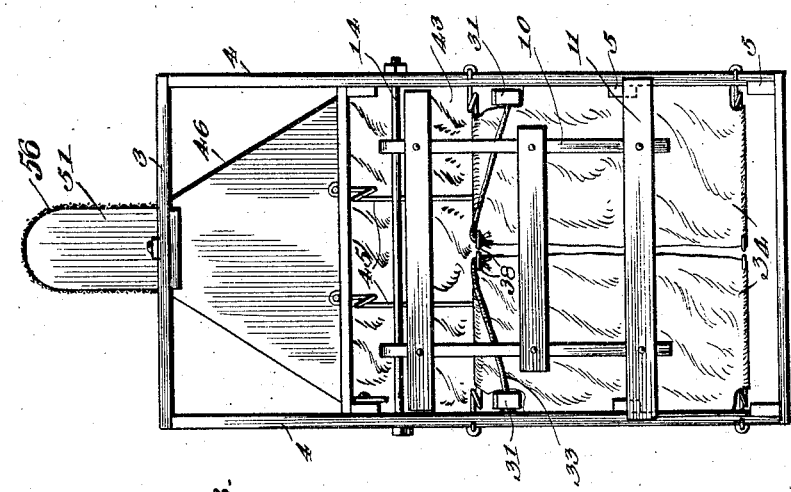
WITNESSES
INVENTOR
C. A. Fleming,
BY
ATTORNEYS June 16, 1925.
C. A. FLEMING
FLYTRAP
Filed Jan. 22, 1924 4 Sheets-Sheet 4
1,541,805
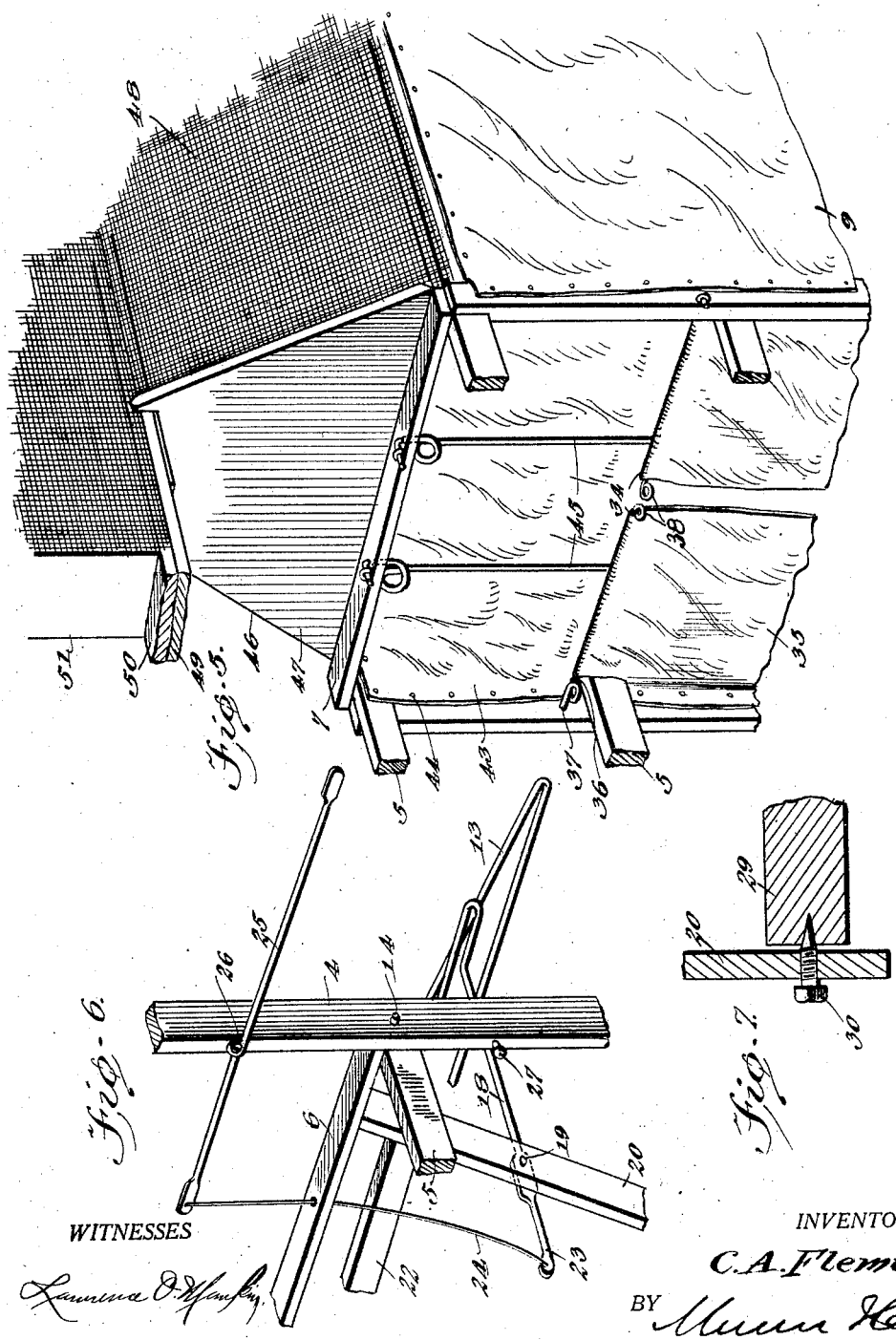
WITNESSES
INVENTOR
C. A. Fleming
BY
ATTORNEYS Patented June 16, 1925.

1,541,805

UNITED STATES PATENT OFFICE.

CLIFFORD A. FLEMING, OF HUNTSVILLE, MISSOURI.

FLYTRAP.

Application filed January 22, 1924. Serial No. 687,815.

*To all whom it may concern:*

Be it known that I, CLIFFORD A. FLEMING, a citizen of the United States, residing at Huntsville, in the county of Randolph and State of Missouri, have invented certain new and useful Improvements in Flytraps, of which the following is a specification.

My invention relates generally to improvements in fly traps, more particularly to improvements in fly traps which are adapted for use in effecting the removal of insects from cattle or other live stock and the entrapping of such insects, and it consists in the combinations, constructions and arrangements herein described and claimed.

An object of the invention is to provide a trap of the character described which includes a frame structure through which cattle may pass in sequence and which also includes means actuated continuously to engage with a cow when the latter is passing through the frame structure to brush flies or other insects from the cow.

A further object of the invention is to provide a trap of the character described which includes a removable case or trap proper for imprisoning the insects which are brushed from a cow while the latter is passing through a frame structure which is comprised in the trap.

A further object of the invention is to provide a trap of the character described which is adapted to be used to effect the removal of insects from cows or like animals of various sizes within a considerable range.

A still further object of the invention is to provide a trap of the character described which includes a frame structure through which cattle may pass in one direction and means for engaging with the cattle to brush insects from the latter in combination with means operable at will for holding the cattle engaging means in inactive position and for keeping the frame open so that cattle unaccustomed to the trap may pass unhindered through the frame structure until trained to make use of the trap.

Other objects and advantages will be apparent from the following description, considered in conjunction with the accompanying drawings, in which Figure 1 is a side elevation of a trap embodying the invention, showing a guard gate at the rear end of the trap in raised or inactive position but showing the trap otherwise ready for use, Figure 2 is a longitudinal vertical section through the trap, showing the trap open from one end to the other end thereof, Figure 3 is a rear end view of the trap, showing the guard gate closed, Figure 4 is a transverse vertical section through the trap, the view being taken substantially along the line 4—4 of Figure 1, looking in the direction of the arrows, Figure 5 is a relatively enlarged fragmentary perspective view of the trap, showing the means for engaging with a cow which is passing through the trap to brush insects from the cow, Figure 6 is a fragmentary perspective view showing elements of the frame structure and of movable parts carried thereby, and Figure 7 is a sectional detail view, showing a portion of a roller which is comprised in the device and illustrating the manner of rotatably supporting the roller.

As is well known, cattle sometimes suffer torture from the bites of insects which cling to the cattle until forcibly dislodged therefrom. In order to remove the insects, the cattle will run through brush since they have learned that the brush will frictionally engage with their bodies and will dislodge the insects therefrom. The exertions of the cattle in effecting the removal of insects from their bodies cause them to lose flesh and in the case of milch cows to give less milk than usual, thus tending to lessen the value of the cattle.

To the end that cattle or like animals may effect the removal of insects from their bodies without such exertion as might tend to impair their health or lessen their value in any way, I have provided a trap having a frame structure through which the cattle may pass when infested with insects, the frame structure being provided with means adapted to effect the removal of insects from the cattle without discomfort to the cattle.

The main frame structure which is comprised in the device includes a pair of substantially parallel sides 1 and 2, respectively, connected at their upper ends by transverse members 3. Each of the sides 1 and 2 includes a pair of upright end members 4 connected together by a plurality of vertically spaced horizontal members 5. The sides 1 and 2 also are connected together at a level lower than that of the transverse members 3 and somewhat higher than the height of a cow or other animal that is to pass through the frame by a transverse bar 6 located at the front of the frame and by a transverse bar 7 located between the plane of the transverse median line of the frame and the rear end of the latter. The transverse bars 6 and 7 preferably are supported at their ends upon the highest of the side members 5. Said highest side members 5 are connected with the remaining side members 5 by vertical members 8 which are located substantially in the vertical plane of the transverse member 7.

With the arrangement described, a cow or like animal may enter the frame at one end of the latter and pass through the frame beneath the transverse bars 6 and 7. Each of the sides 1 or 2 is provided with a side curtain 9 which extends longitudinally of the side from the end member 4 which is at the front end of the frame to the vertical member 8, the side curtain extending vertically from the lower end of the side to the highest member 5 thereof. The curtain 9 may be made of canvas or like durable and closely woven fabric.

A guard gate 10 is pivotally supported to swing by gravity to position between the end members 4 at the rear end of the frame. The guard gate 10 is adapted to be swung outwardly and upwardly to open position and includes a transverse member 11 having extending end portions for engaging with the end members 4 at the rear end of the frame to prevent the gate from swinging inward through the plane of the rear end of the frame or in other words from closed position. A hook 12 carried by one of the sides of the frame may be engaged with the gate 10 to hold the latter in outwardly and upwardly swung or open position.

A substantially U-shaped canopy frame 13 has the arms thereof pivotally supported at their extremities on a transverse rod 14 which spans the sides 1 and 2 at the front end of the frame and is located in the plane of the highest side members 5. A canopy cover 15 is secured on the canopy frame 13 and has side flaps 16′ secured to the end members 4 at the front end of the frame. The canopy cover 15 and the side flaps 16′ are made of a suitable flexible and closely woven material, such as canvas or the like. Since the side flaps are made of a flexible material, the canopy frame is capable of limited swinging movement about the axis of the rod 14. The canopy provides a closure for the frame at the front end of the latter when such canopy has been swung downward by gravity until it is located substantially in the plane of the front end of the frame. When the canopy is in outwardly and upwardly swung, or open position, a cow or like animal may pass therebelow into the frame of the device. A pair of side guard members 16 for protecting the canopy is provided, each guard member 16 comprising two bars pivotally connected together at their outer ends and respectively pivoted at their inner ends to the proximate end member 4 at different heights. The guard members 16 carry pivoted latching members 17, each of which normally is positioned in the plane of the guard member 16 with which it is associated but which may be swung inward to position to engage with the frame 13 of the canopy when the latter is in outwardly swung or fully open position to hold the canopy in open position.

A pusher member 18 is substantially U-shaped and includes a web portion which extends transversely of the main frame structure and presses against the inner wall of the canopy, the arms of the pusher member being pivotally supported, as at 19 on arms 20. A retractile spring 21 is secured at its lower end to the web of the pusher member and at its upper end to a cross bar 22 which spans the arms 19, the spring 21 acting continuously on the pusher member and tending to swing the web portion of the pusher member outward and upward and to thus hold the canopy in open position. One of the arms of the pusher member has an axial extension 23 at its pivoted end and to the extreme end portion of the axial extension is attached a rope 24 which connects the extension to one end of a lever 25 which is pivoted intermediate its length at 26 to one of the end members 4. When the lever 25 is disposed horizontal, the cable 25 is loose and the spring 21 is permitted to function to cause the canopy to swing to open position. The lever 25 may be swung from the position illustrated in Figure 4 to substantially vertical position with the free end of the lever lowermost and engaged with a stud or screw head 27. The latter protrudes from the upright 4 with which the lever 25 is associated. When the lever 25 is substantially vertical and the free end portion thereof is lowermost, the cable 24 will be taut and the pusher member will be prevented from moving outward and upward in response to the action of the spring 21 and the canopy will be permitted to swing downward by gravity to position to close the main frame structure at the front end of the latter.

The respective arms 20 are pivotally supported adjacent to their upper ends on the rod 14 and are disposed adjacent to opposite sides of the main frame structure. The arms 20 are provided adjacent to the lower ends thereof with series of openings 28. Corresponding openings 28 are in alinement. A roller 29 is rotatably supported on the tapering adjacent ends of pivot pins or screws 30. The latter may be engaged with the openings 28 selectively so that the roller 29 may be adjusted vertically.

Pitmen 31 are pivotally connected at their forward ends to the swinging arms 20 and extend slidably through guiding and supporting straps 32. The latter are carried by the upright side members 8. Links 33 connect the rearward ends of the pitmen 31 to the upper end portions of a pair of flexible swinging doors 34 which span the main frame structure in the plane of the upright members 8. Each door 34 includes a fabric section 35 and a pair of horizontally disposed spring supporting members 36 at the upper and lower ends of the fabric section, the spring members being secured at their outer ends as at 37 to one of the uprights 8 and being formed with loops or eye portions 38 at their inner ends, the links 33 being attached to the eye portions of the upper supporting members 36 of the two doors. Pins 39 may be inserted in vertical openings 40 in the pitmen 31 when the latter have been moved bodily toward the rear end of the main frame structure to the position illustrated in Figure 2, the pins then engaging with the guiding and supporting members 32 to hold the pitmen against movement toward the front end of the main frame structure and the doors 34 thus held open at their upper ends. At the same time, the arms 20 and the roller 29 will be held in inwardly and upwardly swung or open position and the doors 34 may be held open at their lower ends by means of hooks 41 which are attached to the lowermost of the horizontal bars 5 of the sides 2 and are engageable with the eyes 38 of the lower spring supporting members 36. The pins 39 may be held against accidental loss when not in use by flexible members 42 which connect the pins with the main frame structure.

The doors 34 terminate short of the plane of the uppermost members 5 and cooperate with a flexible curtain 43 to close the main frame structure in the plane of the uprights 8 when the doors 34 are in closed position. The curtain 43 is secured at its ends, as at 44, to the uprights 8 and in a like manner at its upper end to the transverse member 7. Spaced spring members 45 having the upper end portions thereof secured to the transverse member 7 are disposed in contiguous relation to the rear face of the curtain 43 and tend to prevent the latter from swinging rearwardly.

An outlet 46 for the space which is defined within the frame structure by side curtains 9, the canopy at the front end of the main frame and the transverse curtain 43 and doors 34 is provided by a roof like superstructure 45 which is supported on the uppermost horizontal bars 5 of the sides of the main frame between the transverse bars 6 and 7. The outlet member 46 has imperforate ends 47 inclined foraminous sides 48, and a flat top plate 49. The latter extends the entire length of the main frame structure and supports the base 50 of an insect receptacle 51. The latter is releasably secured in position on the top plate by means of pivoted latch members 52 which are carried by the transverse bars 3 and may be swung to and from position to hold the base of the receptacle 51 clamped down on the top plate. The top plate 49 and the base 50 have aligned openings 53 and 54, respectively, through which insects may pass into the receptacle 51. The latter may be of any suitable construction and preferably comprises an inner case 55 and an outer case 56. Insects may pass from the opening 54 into the inner case which has imperforate end walls and oppositely inclined upwardly convergent side walls made of a foraminous material and spaced slightly apart at their upper ends to provide a narrow passage through which insects may pass into the outer case 56. The latter has side walls and the upper wall made of a foraminous material and may have a normally closed opening 57 in one of the end walls thereof through which insects may be removed from the receptacle.

From the foregoing description of the various parts of the device the operation thereof may be readily understood. The canopy at the front end of the device, the roller 29, the swinging doors 34 and the guard gate 10 may be held in open position in the manner described until the cattle have become accustomed to passing through the frame structure. When this has been accomplished the guard gate 10 and swinging doors 34 are permitted to close and the roller 29 is lowered. The lever 25 is secured in vertical position and the canopy will be held open to an extent sufficient to admit a cow or like animal into the frame structure. The position of the roller is adjusted vertically according to the height of the animals which will pass through the frame structure. When an animal enters the frame structure beneath the canopy, the roller will engage with the animal's back and will be moved inward as the animal passes into the device, thereby operating the pitmen 31 and causing the doors 34 to swing apart slightly at their upper ends. The lower part of the device is dark and the partial opening of the doors 34 admits sufficient light to enable the animal to pass between the doors 34 and beneath the transverse curtain 43. The doors 34 will be swung apart and the curtain 43 will be swung rearwardly and upwardly by the animal passing through the device and these spring pressed parts will closely engage with the animal and will brush any insects from the animal's body. The guard gate will be swung open when contacted by the animal and egress of the animal at the rear end of the trap thus is permitted. The doors 34, curtain 43 and roller 29 all return to normal position when disengaged by the animal that is passing through the device and then are in position to be engaged by the next animal entering the device. When all the animals afflicted with insects at a given time have passed through the device, the lever 25 may be operated to permit the canopy at the front of the device to move by gravity to fully closed position. The lower part of the device then being dark, the insects will fly upward toward the light and will pass through the superstructure 46 into the insect receptacle 51.

The guard members 16 not only carry the supports for holding the canopy in fully open position but also protect the side curtains and the canopy from being gored or hooked by the animals for the use of which the device is provided.

Obviously my invention is susceptible of embodiment in forms other than that illustrated in the accomapnying drawings and I therefore consider as my own all modifications and adaptations of the form of the device herein disclosed that fairly fall within the scope of the appended claims.

I claim:

1. In a device of the character described, a frame structure closed at its sides and providing a passageway for animals, an upwardly swinging canopy for closing the frame structure at its entrance end, spring actuated means carried by the frame structure and tending to open said canopy, and a lever connected with said spring actuated means and operable to render the latter ineffective to open the canopy.

2. In a device of the character described, a frame structure having an outwardly opening guard gate at one end thereof, a transverse swingingly supported roller adjacent to the other end of the frame structure, a pair of swinging doors positioned between said guard gate and the roller, and means actuated by the bodily movement of said roller toward said guard gate to partly open said swinging doors.

3. In a device of the character described, a frame structure having an outwardly opening guard gate at one end thereof, a transverse swingingly supported roller adjacent to the other end of the frame structure, a pair of swinging doors positioned between said guard gate and the roller, and means actuated by the bodily movement of said roller toward said guard gate to partly open said swinging doors, said roller being adjustable vertically.

4. In a device of the character described, a frame structure having an outwardly opening guard gate at one end thereof, a transverse swingingly supported roller adjacent to the other end of the frame structure, a pair of swinging doors positioned between said guard gate and the roller, and means actuated by the bodily movement of said roller toward said guard gate to partly open said swinging doors, said swinging doors being flexible and spring pressed toward closed position.

5. In a device of the character described, a frame structure having an outwardly opening guard gate at one end thereof, a transverse swingingly supported roller adjacent to the other end of the frame structure, a pair of swinging doors positioned between said guard gate and the roller, and a transverse flexible curtain above said swinging doors.

6. In a device of the character described, a frame structure having an outwardly opening guard gate at one end thereof, a transverse swingingly supported roller adjacent to the other end of the frame structure, a pair of swinging doors positioned between said guard gate and the roller, and a transverse flexible curtain above said swinging doors, said curtain being spring pressed toward closed position.

7. In a device of the character described, a frame structure having an outwardly opening guard gate at one end thereof, a transverse swingingly supported roller adjacent to the other end of the frame structure, a pair of swinging doors positioned between said guard gate and the roller, and means actuated by the bodily movement of said roller toward said guard gate to partly open said swinging doors, said swinging doors being flexible and spring pressed toward closed position, and means whereby said guard gate and said swinging doors may be releasably held in open position and said roller may be held in raised position.

8. In a device of the character described, a frame structure providing a passageway for animals, a pair of swinging arms adjacent to one end of the passageway, a roller carried by said arms and extending transversely of the passageway in position to engage with the back of an animal passing through the passageway, a pair of swinging doors extending transversely of the passageway and positioned in spaced relation to said roller, and pitmen connecting said arms and said doors.

9. In a device of the character described, a frame structure providing a passageway for animals, a pair of swinging arms adjacent to one end of the passageway, a roller carried by said arms and extending transversely of the passageway in position to engage with the back of an animal passing through the passageway, a pair of swinging doors extending transversely of the passageway and positioned in spaced relation to said roller, and pitmen connecting said arms and said doors, said doors being spring pressed toward closed position.

10. In a device of the character described, a frame structure providing a passageway for animals, a pair of swinging arms adjacent to one end of the passageway, a roller carried by said arms and extending transversely of the passageway in position to engage with the back of an animal passing through the passageway, a pair of swinging doors extending transversely of the passageway and positioned in spaced relation to said roller, and pitmen connecting said arms and said doors, said doors being spring pressed toward closed position, and a flexible spring pressed curtain adapted to cooperate with said doors to close said passageway.

CLIFFORD A. FLEMING.